(12) United States Patent
Jang et al.

(10) Patent No.: US 10,099,646 B2
(45) Date of Patent: Oct. 16, 2018

(54) AIRBAG APPARATUS FOR VEHICLE

(71) Applicant: HYUNDAI MOBIS CO., LTD., Seoul (KR)

(72) Inventors: Rae Ick Jang, Seongnam-si (KR); Jae Hyun Kim, Seongnam-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 95 days.

(21) Appl. No.: 15/339,553

(22) Filed: Oct. 31, 2016

(65) Prior Publication Data

US 2017/0369025 A1  Dec. 28, 2017

(30) Foreign Application Priority Data

Jun. 23, 2016 (KR) ........................ 10-2016-0078901

(51) Int. Cl.
*B60R 21/233* (2006.01)
*B60R 21/239* (2006.01)
*B60R 21/231* (2011.01)

(52) U.S. Cl.
CPC .......... *B60R 21/233* (2013.01); *B60R 21/231* (2013.01); *B60R 21/239* (2013.01); *B60R 2021/23324* (2013.01)

(58) Field of Classification Search
CPC ................ B60R 21/233; B60R 21/239; B60R 2021/23324
See application file for complete search history.

(56) References Cited

U.S. PATENT DOCUMENTS

| | | | | |
|---|---|---|---|---|
| 7,654,561 | B2* | 2/2010 | Webber | B60R 21/233 280/729 |
| 9,533,652 | B1* | 1/2017 | Paxton | B60R 21/239 |
| 2008/0143086 | A1* | 6/2008 | Higuchi | B60R 21/233 280/736 |
| 2015/0069741 | A1* | 3/2015 | Shimazu | B60R 21/18 280/728.3 |
| 2015/0298643 | A1* | 10/2015 | Schneider | B60R 21/233 280/729 |
| 2015/0321636 | A1* | 11/2015 | Jang | B60R 21/233 280/743.2 |
| 2016/0046257 | A1* | 2/2016 | Yamada | B60R 21/2338 280/729 |
| 2016/0144820 | A1* | 5/2016 | Shin | B60R 21/239 280/735 |
| 2017/0282840 | A1* | 10/2017 | Pendse | B60R 21/233 |
| 2018/0050654 | A1* | 2/2018 | Spahn | B60R 21/205 |

* cited by examiner

*Primary Examiner* — James A English
(74) *Attorney, Agent, or Firm* — Knobbe Martens Olson & Bear LLP

(57) ABSTRACT

Disclosed is an airbag apparatus for a vehicle. The disclosed airbag apparatus for a vehicle includes a main cushion part configured to support a passenger's body by being deployed, a vent hole part formed in the main cushion part and configured to pass gas, a tube part coupled to the main cushion part and configured to guide a movement of the gas passed through the vent hole part, and a sub-cushion part coupled to the main cushion part, formed to surround the tube part, and configured to support the head of the passenger at the time of deployment.

10 Claims, 6 Drawing Sheets

AIRBAG APPARATUS FOR VEHICLE

CROSS-REFERENCE TO RELATED APPLICATION

The present application claims priority under 35 U.S.C 119(a) to Korean Application No. 10-2016-0078901, filed on Jun. 23, 2016, which is herein incorporated by reference in its entirety.

BACKGROUND

1. Technical Field

Various embodiments of the present disclosure relate to an air bag apparatus, and more particularly, to an airbag apparatus for vehicle, which can protect the head of a passenger quickly.

2. Related Art

In general, an airbag apparatus refers to an apparatus which mitigates the impact of a passenger and prevents damage by an appropriate expansion of an airbag cushion when a vehicle accident occurs. Accordingly, the expansion behavior of the airbag cushion plays an extremely important role in ensuring the safety of the passenger.

The related art of the present invention is disclosed in Korean Patent Laid-open Publication No. 10-2016-0008014 published on Jan. 21, 2016 and entitled "Airbag device for vehicle".

SUMMARY

According to an embodiment, an airbag apparatus for vehicle may include: a main cushion part configured to support the body of a passenger by being deployed; a vent hole part formed in the main cushion part and configured to pass gas; a tube part coupled to the main cushion part and configured to guide a movement of gas passed through the vent hole part; and a sub-cushion part coupled to the main cushion part, formed to surround the tube part, and configured to support a head of the passenger at a time of deployment.

The vent hole part is formed in a front upper portion of the main cushion part such that the gas is discharged in a direction of the head of the passenger.

The tube part comprises: a tube coupling part coupled to the main cushion part such that the vent hole part is disposed at an inner side; and a tube guide part connected by the tube coupling part and configured to guide the movement of the gas passed through the vent hole part.

The tube guide part is connected to the tube coupling part, and formed to be protruded toward an inner side of the sub-cushion part, and thereby guiding the movement of the gas passed through the vent hole part toward the inner side of the sub-cushion part.

The sub-cushion part is formed to be protruded forward more than the main cushion part at the time of deployment.

The sub-cushion part comprises: a sub-coupling part coupled to the main cushion part so that the tube guide part is disposed at an inner side; and a sub-supporting part configured to extend from the sub-coupling part and be protruded toward the head of the passenger, and thereby supporting the head of the passenger.

The sub-supporting part is moved toward the tube guide part and blocks the passage formed in the tube guide part, when the sub-supporting part is pressed by the passenger.

The sub-cushion part further comprises a sub-blocking part that is formed on the inner side of the sub-supporting part, inserted into the tube part when the sub-supporting part is pressed, and restricts the movement of the gas though the tube part.

The sub-blocking part comprises: a blocking bar portion that is inserted when the sub-supporting part is pressed by the passenger; a blocking wing portion formed to be protruded at an outside of the blocking bar portion; and a blocking-connecting portion for connecting an end portion of the blocking bar portion to the sub-supporting part.

An end portion of the blocking bar portion is opened and the other end portion of the blocking bar portion, which directs to the tube part, is closed, so that the blocking bar portion is expanded toward the tube part when the gas is introduced.

The blocking wing portions are provided in multiple numbers, and disposed along a length direction of the blocking bar portion.

The blocking wing portions are protruded in a side direction of the blocking bar portion, progress from an end portion to the other end portion of the blocking bar portion, and formed to be inclined in a direction to be spaced apart from the blocking bar portion.

An outer diameter of the blocking wing portion is larger than an inner diameter of a gas passage formed in the tube guide part.

DETAILED DESCRIPTION OF THE EMBODIMENTS

Embodiments of the invention will hereinafter be described in detail with reference to the accompanying drawings. It should be noted that the drawings are not to precise scale and may be exaggerated in thickness of lines or sizes of components for descriptive convenience and clarity only.

Furthermore, the terms as used herein are defined by taking functions of the invention into account and can be changed according to the custom or intention of users or operators. Therefore, definition of the terms should be made according to the overall disclosures set forth herein.

Generally, the required expansion behaviors of an airbag cushion are in that the airbag cushion needs to quickly restrain the passenger by a rapid expansion in its initial deployment, and the airbag cushion needs to properly buffer the passenger by properly discharging the expansion gas inside the airbag cushion when the passenger starts to contact the airbag cushion and applies load to the airbag cushion.

Also, the airbag cushion needs to be able to properly meet the requirements of various laws and regulations, such as the North American low risk deployment (LRD) regulation. Accordingly, a venting structure for adjusting the inner pressure of the airbag cushion to rapidly restrain the passenger has been continuously developed.

Meanwhile, in order to meet the requirements according to the laws and regulations, a vent hole of the airbag cushion needs to be opened and some of the expansion gas needs to be discharged in the initial deployment of the airbag cushion. Also, for the rapid expansion of the airbag cushion, the vent hole needs to be closed as possible in the early deployment of the airbag cushion, and the vent hole needs to be opened and the expansion gas needs to be discharged when the vent hole reaches fully opened state and the passenger starts to be loaded.

As such, it is difficult to implement the airbag cushion such that the vent hole is opened or closed properly at the appropriate time, according to the deployment process of the airbag cushion and a condition of a passenger seat. In particular, the volume of the airbag cushion has been increased to increase the forward protrusion amount in the art, but the deployment of the airbag cushion is delayed and the airbag cushion cannot restrain the head of the passenger at an early time.

Figure 1:
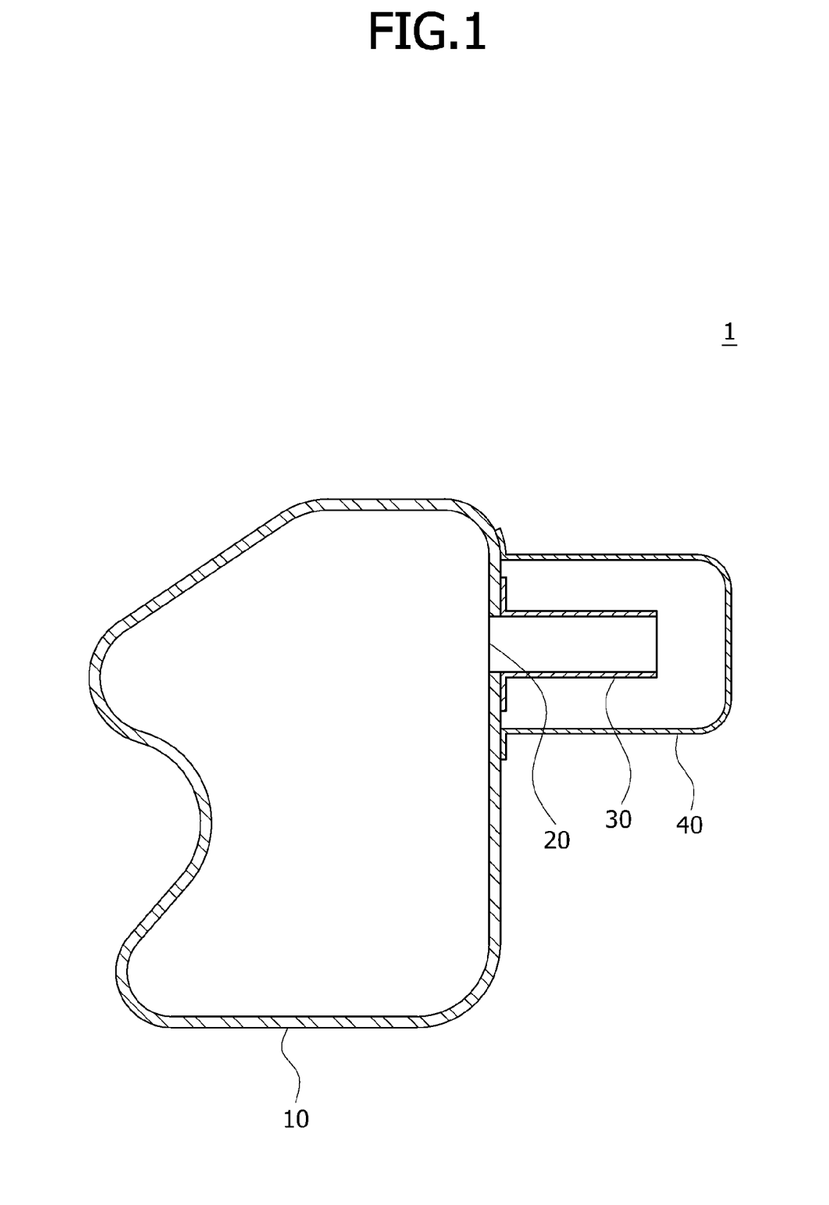
FIG. 1 schematically illustrates an airbag apparatus for a vehicle according to an embodiment of the present disclosure.
Figure 2:
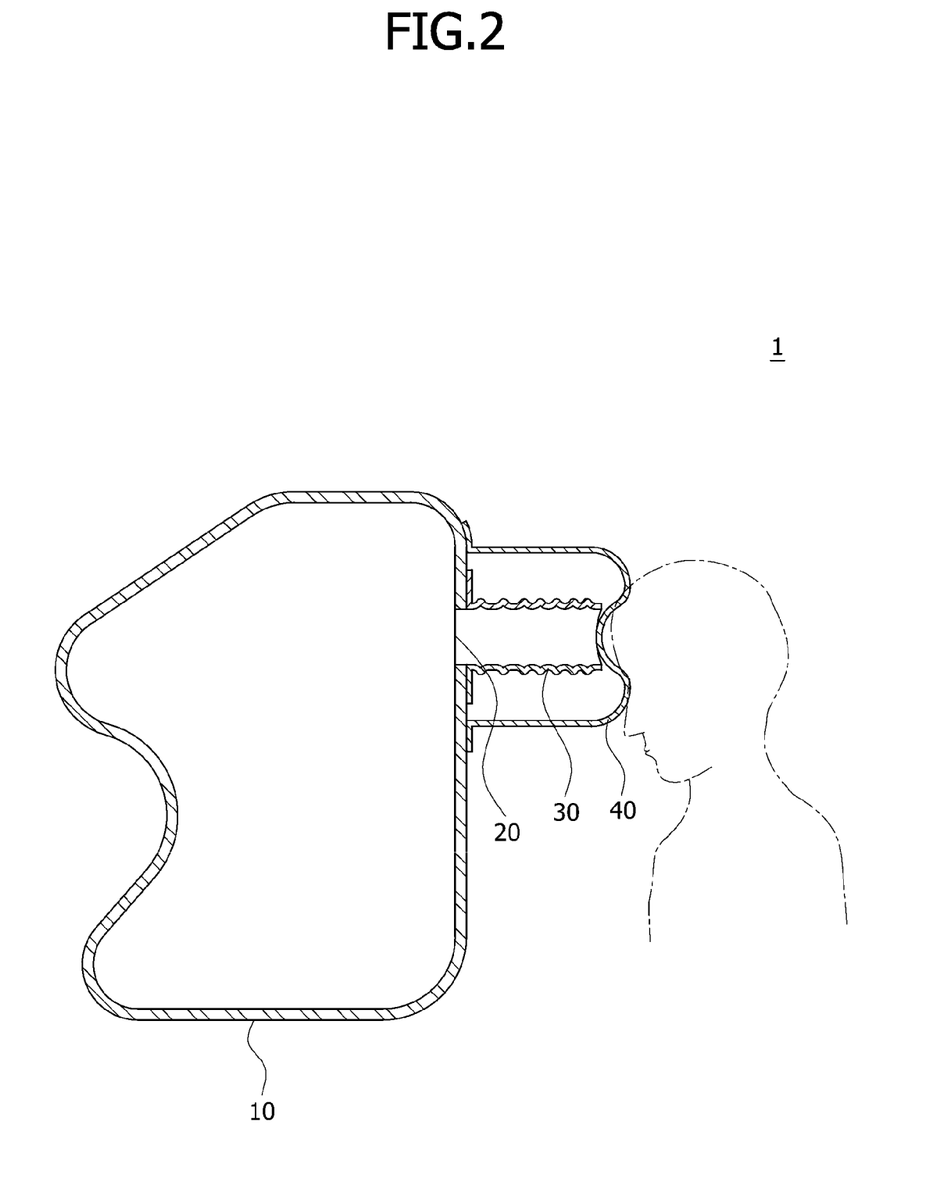
FIG. 2 is a view schematically illustrating a state in which an airbag apparatus for a vehicle according to an embodiment of the present disclosure protects a head of the passenger.

FIG. 1 schematically illustrates an airbag apparatus for a vehicle according to an embodiment of the present disclosure, and FIG. 2 is a view schematically illustrating a state in which the airbag apparatus for a vehicle according to an embodiment of the present disclosure protects a head of the passenger.

Referring to FIGS. 1 and 2, the airbag apparatus 1 for a vehicle according to an embodiment of the present disclosure may include a main cushion part 10, a vent hole part 20, a tube part 30, and a sub-cushion part 40.

The main cushion part 10 normally maintains a folded state, is deployed by the gas generated by an inflator, and supports the body of the passenger in the front seat of the vehicle when a vehicle collision occurs.

The vent hole part 20 is formed in the main cushion part 10 and passes the gas in a direction of the passenger. For example, the vent hole part 20 may be formed in a front upper portion of the main cushion part 10 and may discharge the gas in a direction of a face of the passenger.

The tube part 30 is coupled to the main cushion part 10, and guides the gas passed through the vent hole part 20. The sub-cushion part 40 is coupled to the main cushion part 10, is formed to surround the tube part 30, and supports the head of the passenger at the time of deployment. In other words, the main cushion part 10 may be expanded by the gas and may protect the passenger's body, and the sub-cushion part 40 may be expanded by the gas and may protect a face and head of the passenger.

Figure 3:
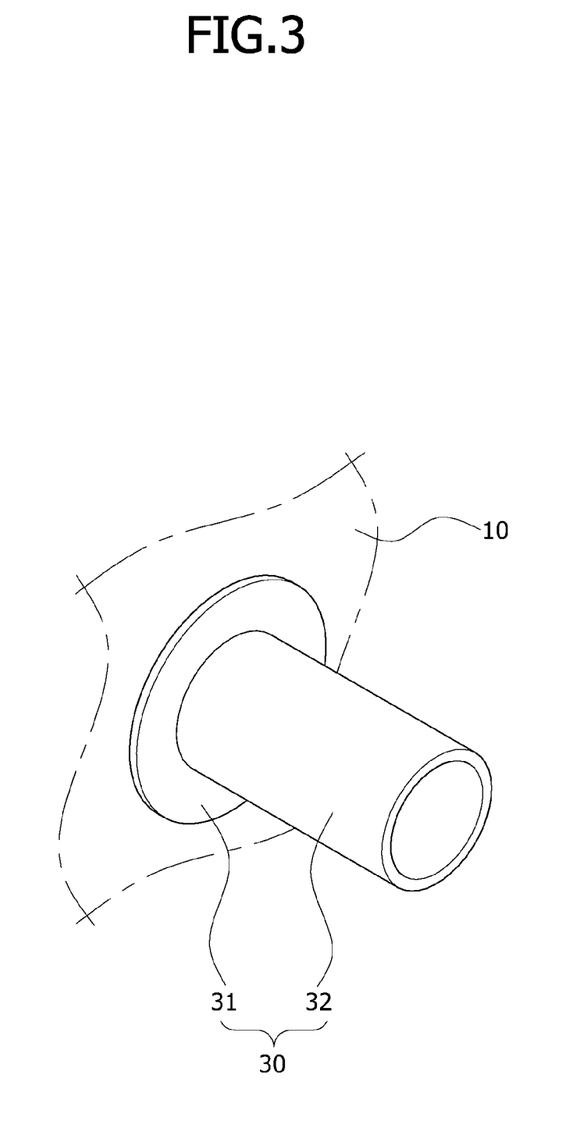
FIG. 3 is a view schematically illustrating a tube part in an airbag apparatus for a vehicle according to an embodiment of the present disclosure.

FIG. 3 is a view schematically illustrating a tube part in an airbag apparatus for a vehicle according to an embodiment of the present disclosure.

Referring to FIGS. 1 to 3, the tube part 30 according to an embodiment of the present disclosure may include a tube coupling part 31 and a tube guide part 32.

The tube coupling part 31 is coupled to an outer side of the main cushion part 10 such that the vent hole part 20 is disposed in an inner side. For example, the tube coupling part 31 may be disposed in a stripe shape along the periphery of the vent hole part 20. The tube coupling part 31 may be sewed with the main cushion part 10 and may be maintained a coupled state.

The tube guide part 32 extends from the tube coupling part 31 and guides the gas passed through the vent hole part 20. For example, the tube guide part 32 includes a fabric material corresponding to the main cushion part 10 to be folded easily, and has a tube shape such that the gas passes therethrough.

Figure 4:
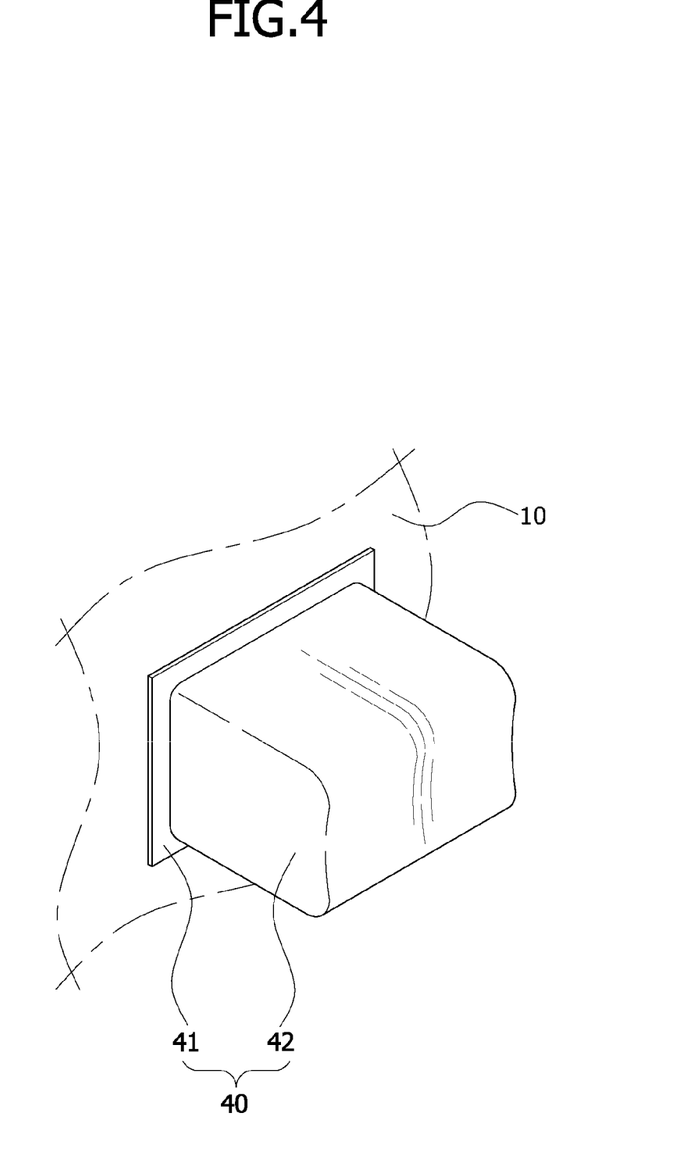
FIG. 4 is a view schematically illustrating a sub-cushion part in an airbag apparatus for a vehicle according to an embodiment of the present disclosure.

FIG. 4 is a view schematically illustrating a sub-cushion part in an airbag apparatus for a vehicle according to an embodiment of the present disclosure.

Referring to FIGS. 1 to 4, the sub-cushion part 40 according to an embodiment of the present disclosure may further include a sub-coupling part 41 and a sub-supporting part 42.

The sub-coupling part 41 is coupled to the main cushion part 10 such that the tube guide part 32 is disposed at an inner side. For example, the sub-coupling part 41 may be disposed in a stripe shape along the periphery of the vent hole part 31. The sub-coupling part 41 may be sewed with the main cushion part 10 and may be maintained the coupled state.

The sub-supporting part 42 extends from the sub-coupling part 41, is protruded toward the passenger and protects the head of the passenger at the time of deployment. For example, the sub-supporting part 42 may have a shape of a pillar having an opened end portion, and another end portion extends from the sub-coupling part 41. The sub-supporting part 42 includes a fabric material corresponding to the main cushion part 10 to be folded easily, and can be easily expanded when the gas is supplied. In order to protect the head of the passenger, the sub-supporting part 42 is located at a front upper portion of the main cushion part 10, and may be protruded forwardly more than the main cushion part 10.

When the main cushion part 10 and the sub-supporting part 42 are expanded toward the passenger at the same time and the sub-supporting part 42 is pressurized by the collision with the head of the passenger, the sub-supporting part 42 is pushed into the inside and blocks the gas flow path of the tube guide part 32. Accordingly, the gas of the sub-cushion part 40 is not discharged through the vent hole part 20 and the sub-supporting part 42 can support the head of the passenger continuously.

Figure 5:
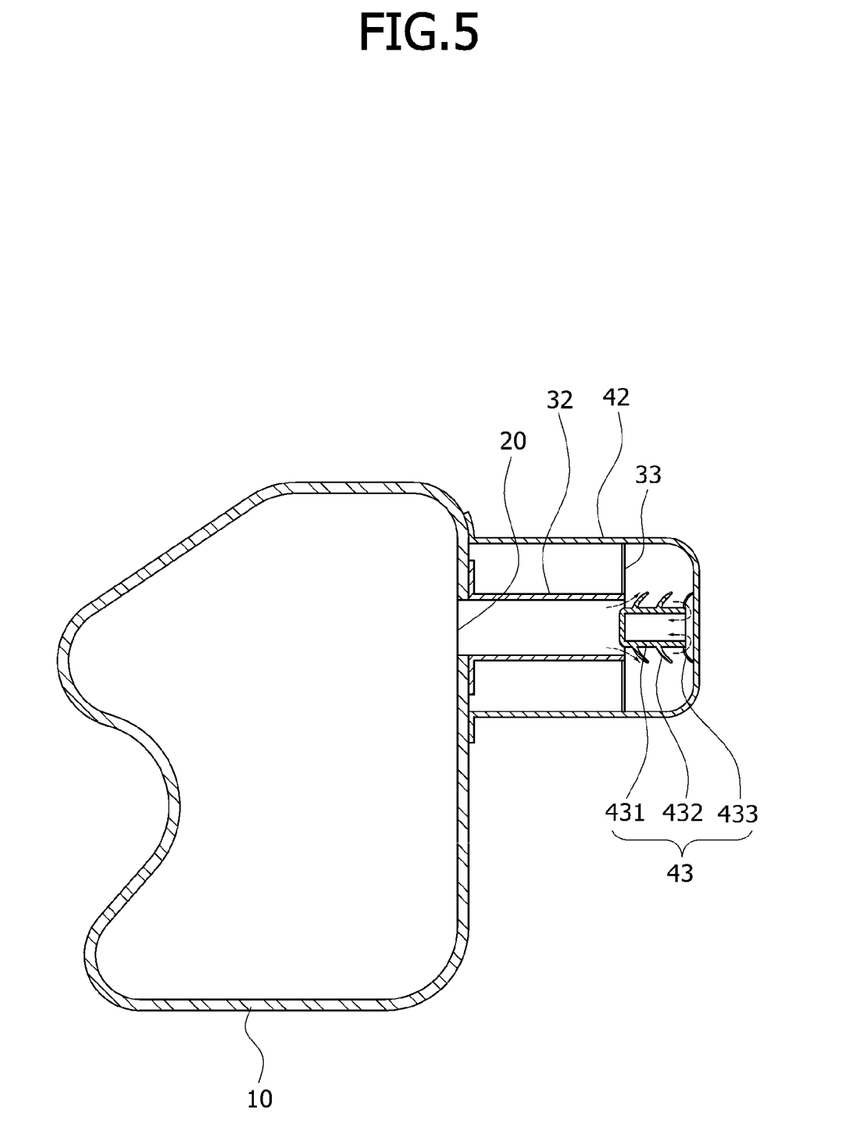
FIG. 5 is a view schematically illustrating a state in which a sub-blocking part is expanded in an airbag apparatus for a vehicle according to an embodiment of the present disclosure.
Figure 6:
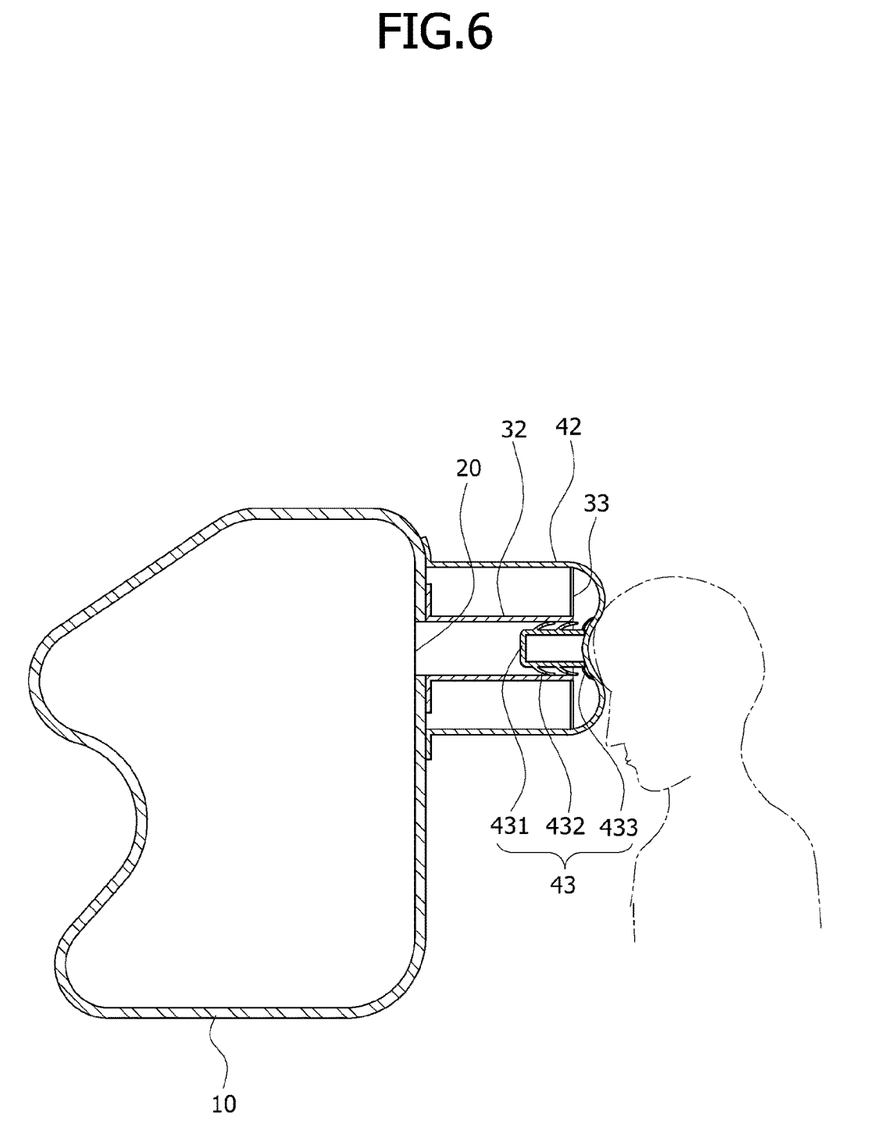
FIG. 6 is a view schematically illustrating a state in which a sub-blocking part blocks a gas movement path of a tube guide unit.

FIG. 5 is a view schematically illustrating a state in which a sub-blocking part is expanded in an airbag apparatus for a vehicle according to an embodiment of the present disclosure, and FIG. 6 is a view schematically illustrating a state in which the sub-blocking part of FIG. 5 blocks a gas movement path of a tube guide part.

Referring to FIGS. 1 to 6, the sub-cushion part 40 according to an embodiment of the present disclosure may further include a sub-blocking part 43. The sub-blocking part 43 is formed at an inner side of the sub-supporting part 42, and inserted into the tube guide part 32 by an external force to limit the gas flow. The sub-blocking part 43 according to an embodiment of the present disclosure may include a blocking bar portion 431, a blocking wing portion 432, and a blocking connection portion 433.

The blocking bar portion 431 is expanded toward the tube guide part 32. For example, the blocking bar portion 431 has a shape of a hollow rod. One end portion of the blocking bar portion 431, which directs to the tube guide part 32 may be closed and the other end portion of the blocking bar part 431, which directs to the inner side of the sub-supporting part 42 may be opened.

The blocking wing portion 432 extends to the outside of the blocking bar portion 431. For example, at least one blocking bar portion 431 may be formed to be protruded in a lateral direction from an outer peripheral surface of the blocking bar portion 431, and to have an inclination in a direction of the sub-support part 42.

The blocking connection portion 433 connects one end portion of the blocking bar portion 431 to the sub-supporting part 42. For example, the blocking connection portion 433 may be one or more cable of which one end is coupled to one end of the blocking bar portion 431 and the other end is coupled to the inner side of the sub-supporting part 42. A stripe produced with thread or fabric may be used as the cable. When the gas is supplied into the sub-supporting part 42 by the blocking connection portion 433, the blocking bar portion 431 can maintain a state to be spaced apart from the sub-supporting part 42 and maintain an expanded state.

Meanwhile, one or more tube connection part 33 is coupled to the end portion of the tube guide part 32, and the tube connection part 33 may be coupled to the sub-supporting part 42. A cable such as a stripe produced with thread or fabric may be used as the tube connection part 33. The tube connection part 33 may restrict a movement of the tube guide part 32 to the end portion after providing the gas and induce a stable insertion of the sub-blocking part 43.

An operation of the airbag apparatus 1 for a vehicle according to an embodiment of the present disclosure, which has the above-described structure, will be described with reference to FIGS. 1 to 6.

If the gas is supplied and the main cushion part 10 is deployed due to a vehicle collision, the sub-cushion 40 interlocked with the main cushion part 10 through the vent hole part 20 is also deployed. Since the sub-cushion part 40 is located at a front upper portion of the main cushion part 10, the sub-cushion part 40 can quickly support a passenger's face, that is a head of the passenger and protect the passenger (see FIG. 1).

If the sub-cushion part 40 is pressurized by the collision with the head of the passenger, the sub-cushion part 40 blocks the tube part 30 that guides the gas supplied through the vent hole part 20, and the internal pressure of the sub-cushion part 40 is maintained (see FIG. 2). This makes it possible to prevent a neck injury of the passenger and the secondary collision, which may occur at a second half of collision between the passenger and the sub-cushion part 40.

Meanwhile, a separate sub-blocking part 43 may be included in the sub-cushion part 40 to maintain the internal pressure. In other words, when the gas flows into the sub-cushion portion 40 and the sub-supporting portion 42 is deployed, the blocking bar portion 431 is expanded by the gas and closes to the inlet of the tube guide part 32 (see FIG. 5).

In the above described state, when the head of the passenger collides with the sub-cushion part 40, the blocking bar portion 431 is inserted into the tube guide part 32, the blocking wing portion 432 extending to the outer side of the blocking bar portion 431 is on close contact with the inner side of the tube guide part 32, and the gas flow path of the tube guide part 32 is blocked (see FIG. 6).

According to the airbag apparatus 1 for a vehicle according to an embodiment of the present disclosure, the sub-cushion part 40 can quickly protect the head of the passenger.

According to the airbag apparatus 1 for a vehicle according to an embodiment of the present disclosure, when the sub-cushion part 40 is pressurized by the head of the passenger, the gas flow path is blocked and the internal pressure is maintained, thereby protecting a passenger's neck and preventing the secondary injury.

According to the airbag apparatus 1 for a vehicle according to an embodiment of the present disclosure, when the sub-cushion part 40 is pressurized by the head of the passenger, the sub-blocking part 43 is inserted into the tube guide part 32 which is the gas flow path, and thus the gas flow path can be closed.

The embodiments of the inventive concept have been disclosed above for illustrative purposes. Those of ordinary skill in the art will appreciate that various modifications, additions and substitutions are possible, without departing from the scope and spirit of the inventive concept as disclosed in the accompanying claims.

What is claimed is:

1. An airbag apparatus for a vehicle, comprising:
   a main cushion part configured to support a passenger's body by being deployed;
   a vent hole part formed in the main cushion part and configured to pass gas;
   a tube part coupled to the main cushion part and configured to guide movement of gas passed through the vent hole part; and
   a sub-cushion part coupled to the main cushion part, formed to surround the tube part, and configured to support a head of the passenger at a time of deployment,
   wherein the tube part comprises a tube coupling part coupled to the main cushion part such that the vent hole part is disposed at an inner side, and a tube guide part connected by the tube coupling part and configured to guide the movement of the gas passed through the vent hole part,
   wherein the sub-cushion part comprises a sub-coupling part coupled to the main cushion part so that the tube guide part is disposed at an inner side, and a sub-supporting part configured to extend from the sub-coupling part and be protruded toward the head of the passenger for supporting the head of the passenger,
   wherein the sub-cushion part further comprises a sub-blocking part that is formed on the inner side of the sub-supporting part, inserted into the tube part when the sub-supporting part is pressed, and configured to restrict the movement of the gas though the tube part.

2. The airbag apparatus of claim 1, wherein the vent hole part is formed in a front upper portion of the main cushion part such that the gas is discharged in a direction of the head of the passenger.

3. The airbag apparatus of claim 1, wherein the tube guide part is connected to the tube coupling part, and formed to be protruded toward an inner side of the sub-cushion part, and thereby guiding the movement of the gas passed through the vent hole part toward the inner side of the sub-cushion part.

4. The airbag apparatus of claim 2, wherein the sub-cushion part is formed to be protruded forward more than the main cushion part at the time of deployment.

5. The airbag apparatus of claim 1, wherein the sub-supporting part is moved toward the tube guide part and blocks a passage formed in the tube guide part, when the sub-supporting part is pressed by the passenger.

6. The airbag apparatus of claim 1, wherein the sub-blocking part comprises:
   a blocking bar portion that is inserted when the sub-supporting part is pressed by the passenger;
   a blocking wing portion formed to be protruded at an outside of the blocking bar portion; and
   a blocking-connecting portion for connecting the blocking bar portion to the sub-supporting part.

7. The airbag apparatus of claim 6, wherein an end portion of the blocking bar portion is opened and the other end portion of the blocking bar portion, which directs to the tube part, is closed, so that the blocking bar portion is expanded toward the tube part when the gas is introduced.

8. The airbag apparatus of claim 6, wherein the sub-blocking part further comprises additional blocking wing portions, and wherein the blocking wing portion and the additional blocking wing portions are disposed along a length direction of the blocking bar portion.

9. The airbag apparatus of claim 6, wherein the blocking wing portion protrudes from a side of the blocking bar portion, and is formed to be inclined with respect to the blocking bar portion.

10. The airbag apparatus of claim 6, wherein an outer diameter of the blocking wing portion is larger than an inner diameter of a gas passage formed in the tube guide part.

* * * * *